United States Patent Office 2,736,729
Patented Feb. 28, 1956

2,736,729

SUBSTITUTION PRODUCTS OF 1,3,4-THIADIAZOLE AND PROCESS

Hans Krzikalla, Heidelberg, and Heinz Pohlemann, Ludwigshafen (Rhine), Germany, assignors to Badische Anilin- & Soda-Fabrik Aktiengesellschaft, Ludwigshafen (Rhine), Germany No Drawing. Application August 9, 1954,
Serial No. 448,753

Claims priority, application Germany August 19, 1953

6 Claims. (Cl. 260—302)

This invention relates to new and valuable derivatives of dimercaptothiadiazole and their preparation. The new compounds are characterized by the atom grouping:

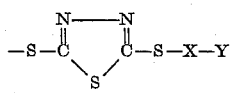

in which X represents —CO—, —SO$_2$— or —CH$_2$— and Y represents a saturated aliphatic or cycloaliphatic group with 5 to 18 carbon atoms and which may be substituted, as for example carboxylated. The free valency can be satisfied by a hydrogen atom or a metal or base equivalent or an aliphatic, cycloaliphatic, araliphatic or aromatic hydrocarbon radical, which may be substituted, or by a group XY or

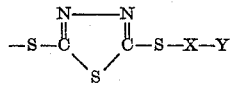

in which X and Y have the above significance. Compounds of the said kind with the atomic grouping —S—(C$_2$N$_2$S$_2$)—S—X—Y are for example 2.5-di-(n-octylmercapto) - 1.3.4 - thiadiazole, 2.5-(di-(2-ethyl-n-hexyl)-mercapto)-1.3.4-thiadiazole, 2 - dodecylmercapto-5-mercapto-1.3.4-thiadiazole, 2,2'-dithio-bis-(5-(2-ethyl-n-hexyl)-mercapto)-1.3.4-thiadiazole, 2.5-(di - (2 - ethyl-n-hexoyl)-mercapto)-1.3.4-thiadiazole, 5-decylsulfonylmercapto-2-mercapto-1.3.4-thiadiazole, 2-(2-ethyl-n-hexylmercapto)-5-carboxymethylmercapto-1.3.4-thiadiazole.

2.5-dimercapto-1.3.4-thiadiazole serves as the initial material for the production of the said compounds. It can be prepared for example from hydrazine in aqueous solution containing a little free alkali or ammonia by treatment with carbon disulfide and acidification (cf. J. Chem. Soc. London, 121, 2542). The crude technical hydrazine solutions which are strongly diluted and already strongly alkaline can also be used instead of hydrazine.

The preparation of the compounds containing the atomic grouping —S—(C$_2$N$_2$S$_2$)—S—X—Y is carried out by reaction of 2.5-dimercapto-1.3.4-thiadiazole with compounds of the general formula Hal—X—Y in which Hal represents a halide and X and Y have the above significance. Such compounds are for example the chlorides, bromides and iodides of saturated aliphatic hydrocarbons, carboxylic acids or sulfuric acids with 6 to 18 carbon atoms, the carbon atoms being straight-chained, branched or cyclic and if desired containing further groups, such as carboxylic groups. Suitable compounds of the formula Hal—X—Y are for example hexyl, heptyl, n-octyl, 2-ethyl-n-hexyl, dodecyl, sperm oil or octadecyl chloride, bromide or iodide, ethylpentane carboxylic acid, sperm oil fatty acid, palmitic acid, decylsulfonic acid, undecylsulfonic acid chloride or bromide.

The reaction of the components takes place in weakly acid to alkaline medium, i. e. in the pH range of about 4 to 11, in diluents such as water, methanol, ethanol or other alcohols. Mixtures of these diluents are also suitable. It is preferable to work in neutral and advantageously in alkaline region, compounds having a strong alkaline reaction, such as caustic alkaline solutions, alkali carbonates, alcoholates or tertiary amines, such as pyridine, being used to set up the selected pH value. Suitable reaction temperatures are between about —10° C. and +200° C. It is advantageous to select temperatures between about 0° and 80° C.

The simplest way of effecting the reaction is by introducing the second component while cooling, or if necessary while heating, into a solution of the 2.5-dimercapto-thiadiazole and allowing the mixture to react. The molecular ratio of the components may be about 1:1 to about 1:2. In the latter case there are obtained compounds of the formula Y—X—S—(C$_2$N$_2$S)—S—X—Y whereas with a molecular ratio of 1:1 compounds of the formula HS—(C$_2$N$_2$S)—S—X—Y or the corresponding mercaptides are obtained which can be converted by conventional methods into salts or mixed thioethers, esters or disulfides. The disulfides are obtained for example by treating the said compounds of the formula HS—(C$_2$N$_2$S)—S—X—Y in the presence of an oxidizing agent, such as alcoholic iodine solution, hydrogen peroxide, bleaching powder liquor or chlorine.

If bifunctional aliphatic or aromatic compounds, as for example Hal—R—Hal, in which R is a divalent hydrocarbon radical, are allowed to act on 2 mols of the monosubstituted 2.5-dimercaptothiadiazoles obtained according to this invention or their alkali salts, compounds of the formula [Y—X—S—(C$_2$N$_2$S)—S—]$_2$=R are obtained. Two or more representatives of the second component can also be allowed to act simultaneously or consecutively on the 2.5-dimercaptothiadiazole, whereby mixed thioethers or esters of 2.5-dimercaptothiadiazole are formed.

The compounds with the atomic grouping

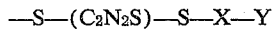

produced according to the said method are especially valuable oil-soluble agents for protecting against light and may be used in an advantageous manner as plasticisers for polyvinyl chloride and other plastics. They may also be added to alkaline cleaning agents containing phosphates in order to prevent the corrosion or tarnishing of metals, or used as wetting, washing or water-proofing agents. They are also suitable as vulcanisation accelerators.

The following examples will further illustrate this invention but the invention is not restricted to these examples. The parts are parts by weight.

Example 1

45 parts of 2.5-dimercapto-1.3.4-thiadiazole are dissolved in 600 parts of methanol, a solution of 24 parts of caustic soda in 40 parts of water and 88.8 parts of n-octyl chloride are added and the whole heated for 2 to 3 hours under reflux. The bulk of the methanol is distilled off, the product poured into ice-water and 2.5-di(n-octylmercapto)-1.3.4-thiadiazole obtained in a yield of 90% after separation. It melts at 32° C. and is suitable for example especially as a light protective agent which is soluble without limit in oil and with which the frequently troublesome crystallizing out of the protective agent on the skin during use is entirely avoided by reason of the advantageous melting point. The light permeability of a 0.005% alcoholic solution at 292 millimicrons amounts to 4%.

Contrasted with the known light protective agents, which have a light protection factor of about 2.5, this compound has a protection factor of about 4 in the case of a 5% aqueous emulsion and a protection factor of about 6 when used as a 5% cream.

Equally good yields of 2.5-di-(n-octylmercapto)-1.3.4- thiadiazole are obtained by using 108 parts of a 30% methanol solution of sodium methylate instead of 24 parts of caustic soda in 40 parts of water, and working otherwise in the manner described above.

By using 115.8 parts of 2-ethyl-n-hexyl bromide instead of the 88.8 parts of n-octyl chloride, there are obtained 100 parts of 2.5-(di-(2-ethyl-n-hexyl-mercapto))-1.3.4-thiadiazole as a yellowish oil having a boiling point of 232° to 235° C. at 0.4 mm. Hg, with slight decomposition. The substance can be used especially well as a plasticiser for polyvinyl chloride (PVC).

Polyvinyl chloride foils which contain 40 parts of 2.5-(di-(2-ethyl-n-hexyl-mercapto))-1.3.4 - thiadiazole to 60 parts of polyvinyl chloride show the following characteristic values:

| | |
|---|---|
| Tensile strength | Before ageing 162. |
| In kg. per sq. cm | After ageing 196. |
| Elongation at break percent | Before ageing 346; after ageing 334. |
| Heat loss in percent after 11 days at 90° C | 2. |
| Water imbibition in percent after 11 days at room temperature. | 10. 8. |
| Strength at low temperatures | Before ageing −35 to −40; after ageing −30 to −35. |
| Specific resistance, ohm, cm | 3.10¹¹. |

Example 2

30 parts of 2.5-dimercapto-1.3.4-thiadiazole are dissolved in 400 parts of alcohol, a solution of 16 parts of caustic soda in 40 parts of water and 100 parts of dodecyl bromide are added and the whole heated under reflux for two hours. It is then poured into 1500 parts of ice-water and the precipitated 2.5-di(dodecylmercapto)-1.3.4-thiadiazole is filtered off by suction. The yield after recrystallization from alcohol (melting point 58° to 60° C.) is 95%. It is particularly suitable as a sunburn preparation.

Example 3

60 parts of 2.5-dimercapto-1.3.4-thiadiazole are dissolved in 750 parts of alcohol, a solution of 16 parts of caustic soda in 80 parts of water and 77.2 parts of n-octyl bromide are added and the whole heated for two hours under reflux. It is poured into 2000 parts of ice-water and the precipitated crystals are filtered off by suction and recrystallized from ligroin. The 2-(n-octylmercapto) - 5 - mercapto-1.3.4 - thiadiazole (melting point 75° C.) is obtained in a yield of 90 to 95%.

By using 96 parts of n-octyl iodide instead of the 77.2 parts of n-octyl bromide and working as above described, the compound is also obtained in equally good yields.

52.4 parts of the 2-(n-octylmercapto)-5-mercapto-1.3.4-thiadiazole obtained as described above are dissolved in 300 parts of alcohol and a solution of 8 parts of caustic soda in 30 parts of water is added. A solution of 25.4 parts of iodine in 300 parts of alcohol is slowly added in small batches at room temperature to the said mixture and the whole well shaken after each addition. The iodine solution is immediately decolored and 2.2'-dithio-bis-(5-n-octylmercapto-1.3.4-thiadiazole) separates as a white compound (melting point 74° C.). The yield is quantitative.

The oxidation to the disulfide can also be carried out in the same way with hydrogen peroxide, sodium hypochlorite or chlorine. The yields are similarly very good.

The disulfide compound is well suited for example as a sunburn preparation.

The compound, for example in a concentration of 0.007% in alcohol, absorbs the ultraviolet radiation of 250 to 340 millimicrons up to 4%.

It is also a good vulcanization accelerator and yields vulcanization products with good mechanical properties. It was tested for example in the following blend:

100 parts of smoked sheets
1.5 parts of stearic acid
10 parts of zinc oxide
3 parts of sulfur and
0.8 part of 2.2'-di-thio-bis-(5-n-octylmercapto-1.3.4-thiadiazole)

The vulcanization product so treated has the following mechanical properties:

Heating=60'/133°
Modulus, 300%=10
Tensile strength=165
Elongation at break=792
Impact resilience=62

Example 4

By reacting 2.5-dimercapto-1.3.4-thiadiazole with 2-ethyl-n-hexyl bromide in the way described in Example 3, 2-(2-ethyl-n-hexylmercapto)-5-mercapto-1.3.4-thiadiazole is obtained. The yield, after recrystallization from petroleum ether, is 87%. The melting point is 55° C.

52.4 parts of 2-(2-ethyl-n-hexylmercapto)-5-mercapto-1.3.4-thiadiazole are dissolved in alcohol and a solution of 8 parts of caustic soda in 30 parts of water is added. At room temperature and while stirring vigorously there is then introduced in batches an alcoholic iodine solution containing in all 25.4 parts of iodine. The 2.2'-dithio-bis-(-5-(2-ethyl-n-hexylmercapto))-1.3.4-thiadiazole is precipitated as a yellowish oil. It is readily soluble in ligroin, petroleum ether and paraffin oil and is suitable as a protective agent against light which absorbs the whole of the ultra-violet light, and also as a vulcanization accelerator.

1500 parts of the 2-(2-ethyl-n-hexylmercapto)-5-mercapto-1.3.4-thiadiazole are heated slowly to 125° to 130° C. with 535 parts of cyclohexylamine while stirring and leading in nitrogen and kept at this temperature for about 10 minutes. 1980 parts of the cyclohexylammonium salt of 2-(2-ethyl-n-hexylmercapto)-5-mercapto-1.3.4-thiadiazole are obtained in the form of a greenish-brown syrup. The compound is a very good vulcanization accelerator which acts especially rapidly. The plateau (levelling effect on the modulus/curing time graph) and the resistance to ageing are very good. The following mixture, for example, was tested:

100 parts of smoked sheets
1.5 parts of stearic acid
10 parts of zinc oxide
3 parts of sulfur and
0.8 part of cyclohexylamine salt of 2-(2-ethyl-n-hexylmercapto)-5-mercapto-1.3.4-thiadiazole The vulcanization product obtained has the following mechanical properties:

Heating=60'/133°
Modulus, 300%=27
Tensile strength=229
Elongation at break=632
Impact resilience=73

The outstanding plateau (levelling effect on the modulus/curing time graph) of the accelerator is illustrated in the following table:

| Heating | Modulus, 300% | Tensile strength | Elongation at break | Impact resilience |
|---|---|---|---|---|
| 20'/111° | 7 | 165 | 841 | 59 |
| 30'/111° | 9 | 198 | 846 | 60 |
| 45'/111° | 13 | 235 | 790 | 62 |
| 60'/111° | 16 | 251 | 754 | 68 |
| 20'/133° | 18 | 279 | 758 | 69 |
| 40'/133° | 22 | 266 | 700 | 71 |
| 60'/133° | 27 | 229 | 632 | 73 |
| 80'/133° | 27 | 226 | 632 | 72 |

Example 5

60 parts of 2.5-dimercapto-1.3.4-thiadiazole are dissolved in 800 parts of alcohol and a solution of 16 parts of caustic soda in 80 parts of water is added. 100 parts of dodecyl bromide are then introduced while shaking well. The whole is boiled on the waterbath under reflux for an hour and poured into 2000 parts of ice-water. The precipitated 2-dodecylmercapto-5-mercapto-thiadiazole is filtered off by suction and recrystallized from alcohol. It melts at 90° C. The yield is 96%.

The sodium compound has very good washing and wetting properties.

The 2-dodecylmercapto-5-mercapto-1.3.4-thiadiazole obtained in the above manner is converted by the method described in Example 3 by oxidation into the corresponding 2.2′-dithio-bis-(5-dodecyl-mercapto-1.3.4-thiadiazole) and recrystallized from alcohol.

Example 6

60 parts of 2.5-dimercapto-1.3.4-thiadiazole are dissolved in 800 parts of alcohol and a solution of 16 parts of caustic soda in 80 parts of water and 133.2 parts of octadecyl bromide are added; the whole is heated to boiling under reflux for an hour and then poured into 2000 parts of ice-water. After filtering off by suction and recrystallizing from alcohol, 2-octadecylmercapto-5-mercapto-1.3.4-thiadiazole which melts at 88° to 90° C. is obtained in a yield of 82%. The oxidation with hydrogen peroxide gives the corresponding disulfide having the melting point 102° to 103° C.

By using sperm oil chloride, sperm oil fatty acid chloride, 2-ethylhexane acid chloride or decyl or undecyl sulfonic acid chloride instead of octadecyl bromide, the corresponding thiadiazoles substituted on one or both sides depending on the amounts are obtained. The compounds substituted on only one side may also be converted into the disulfides or their salts.

Example 7

150 parts of 2.5-dimercapto-1.3.4-thiadiazole are dissolved in 750 parts of alcohol, 40 parts of caustic soda and 60 parts of water, cooled with ice-water and 164 parts of 2-ethyl-pentane carboxylic acid chloride are allowed to flow in slowly while stirring well. The whole is stirred further for 10 minutes at room temperature and then boiled for 2 hours under reflux. The reaction mixture is poured into 2000 parts of ice-water. A red-brown oil is precipitated which is dissolved in dilute caustic soda solution. Dilute hydrochloric acid is added while cooling with ice and the compound thus precipitated is filtered off by suction and recrystallized from 50% aqueous alcohol.

100 parts of 2-(2-ethyl-n-hexoylmercapto)-5-mercapto-1.3.4-thiadiazole of the melting point 179° to 180° C. are obtained.

By using 328 parts of 2-ethyl-pentane carboxylic acid chloride instead of the 164 parts of the 2-ethyl-pentane-carboxylic acid chloride, 290 parts of 2.5-(di-(2-ethyl-n-hexoylmercapto))-1.3.4-thiadiazole are obtained in the form of a red-brown oil.

Example 8

75 parts of 2.5-dimercapto-1.3.4-thiadiazole are dissolved in 500 parts of alcohol and 20 parts of caustic soda in 30 parts of water. While stirring and cooling there are slowly introduced 120 parts of decyl sulfochloride, the whole is stirred for 10 minutes at room temperature and boiled for two hours under reflux. It is poured into 4000 parts of ice-water and 120 parts of 5-decyl-sulfonyl-mercapto-2-mercapto-1.3.4-thiadiazole are obtained in the form of greasy crystals. They are dissolved in a little methanol and by freezing out in a freezing mixture, yellow crystals of the melting point 205° to 210° C. (with decomposition) are obtained.

Example 9

262 parts of the 2-(2-ethyl-n-hexylmercapto)-5-mercapto-1.3.4-thiadiazole obtained according to Example 4 are dissolved in 800 parts of alcohol and 80 parts of caustic soda in 200 parts of water. 94 parts of chloracetic acid dissolved in 200 parts of alcohol are introduced while stirring. The whole is heated for two hours under reflux, the alcohol is evaporated extensively and hydrochloric acid is added after cooling. A yield of about 80% of 2 - (2 - ethyl - n - hexylmercapto) - 5 - carboxymethylmercapto-1.3.4-thiadiazole is obtained in the form of white crystals which can be recrystallized from dilute alcohol. The compound is suitable as a sunburn preparation, especially in aqueous emulsions.

What we claim is:
1. Thiodiazole derivatives of the general formula

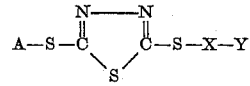

wherein X stands for a bivalent radicle selected from the group consisting of —CO—, —SO₂— and —CH₂— radicles, Y stands for a saturated hydrocarbon radicle containing from 5 to 18 carbon atoms and selected from the saturated aliphatic and cycloaliphatic series, and A represents a member of the group consisting of hydrogen, —X—Y and another group

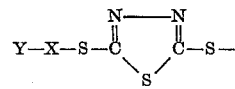

2. 2.5-di-(n-octylmercapto-)1.3.4-thiadiazole.
3. 2-(n-octylmercapto-)-5-mercapto-1.3.4-thiadiazole.
4. The 2.2′-dithio-bis-(5-n-octylmercapto-1.3.4-thiadiazole of the formula

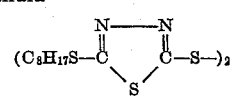

5. The thiadiazole derivative of the formula

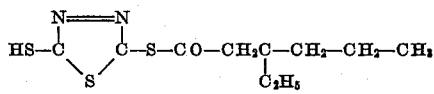

6. The thiadiazole derivative of the formula

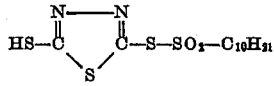

References Cited in the file of this patent

Busch et al.: J. prakt. Chem. (2), vol. 93, p. 339 (1916).
Losanitch: J. Chem. Soc. (London), vol. 121, p. 2542 (1922).
Sandstrom: Chem. Abst., vol. 47, col. 9271 (1953).
Bambas: "Heterocyclic Compounds" (Interscience), pp. 188–9 (1952).